(12) United States Patent
Britton et al.

(10) Patent No.: US 9,708,690 B2
(45) Date of Patent: Jul. 18, 2017

(54) METHOD FOR PLATINUM RECOVERY FROM MATERIALS CONTAINING RHENIUM AND PLATINUM METALS

(71) Applicant: AURIS NOBLE LLC, Fairlawn, OH (US)

(72) Inventors: Louis A. Britton, Akron, OH (US); Georges Z. Markarian, Akron, OH (US)

(73) Assignee: Techemet, LLC, Akron, OH (US)

( * ) Notice: Subject to any disclaimer, the term of this patent is extended or adjusted under 35 U.S.C. 154(b) by 0 days.

(21) Appl. No.: 15/002,730

(22) Filed: Jan. 21, 2016

(65) Prior Publication Data

US 2017/0114428 A1   Apr. 27, 2017

Related U.S. Application Data

(60) Provisional application No. 62/246,524, filed on Oct. 26, 2015.

(51) Int. Cl.
| | |
|---|---|
| C01G 47/00 | (2006.01) |
| C01G 55/00 | (2006.01) |
| C22B 3/42 | (2006.01) |
| C22B 11/00 | (2006.01) |
| C22B 3/00 | (2006.01) |
| C22B 7/00 | (2006.01) |

(Continued)

(52) U.S. Cl.
CPC ............ *C22B 11/04* (2013.01); *C01G 47/003* (2013.01); *C01G 55/001* (2013.01); *C22B 3/0098* (2013.01); *C22B 3/24* (2013.01); *C22B 3/42* (2013.01); *C22B 7/007* (2013.01)

(58) Field of Classification Search
CPC ..... C01G 47/003; C01G 55/001; C22B 11/04; C22B 11/045; C22B 3/42; C22B 3/0098
See application file for complete search history.

(56) References Cited

U.S. PATENT DOCUMENTS 4,069,040 A * 1/1978 Thomas ............... C01G 55/001
                                                         423/22
5,776,329 A    7/1998 Krynitz et al.
(Continued)

FOREIGN PATENT DOCUMENTS

CN   103131857 A  *  5/2013
GB   1153717         6/1966
(Continued)

OTHER PUBLICATIONS

Fujita et al JP 2013095979 A. Machine translation. published May 2013.*

(Continued)

*Primary Examiner* — George Wyszomierski
*Assistant Examiner* — Tima M McGuthry Banks
(74) *Attorney, Agent, or Firm* — Sughrue Mion, PLLC

(57) ABSTRACT

The present disclosure relates to hydrometallurgical methods for the isolation and recovery of platinum from rhenium-containing materials, and more particularly, from superalloys containing rhenium, platinum, and other metals. The disclosure also relates to apparatuses capable of carrying out the hydrometallurgical methods and the product streams generated from the methods and apparatuses.

114 Claims, 2 Drawing Sheets

(51) Int. Cl.
*C22B 3/24* (2006.01)
*C22B 3/20* (2006.01)

(56) References Cited

U.S. PATENT DOCUMENTS

| | | | |
|---|---|---|---|
| 7,166,145 B1 * | 1/2007 | Han | C22B 3/06 75/744 |
| 8,956,582 B2 | 2/2015 | Ferron et al. | |
| 2003/0136685 A1 | 7/2003 | Stoller et al. | |
| 2008/0110296 A1 * | 5/2008 | Thomas | B01J 41/04 75/723 |
| 2009/0255372 A1 | 10/2009 | Olbrich et al. | |
| 2011/0229366 A1 | 9/2011 | Luederitz et al. | |
| 2012/0058029 A1 * | 3/2012 | Ferron | C22B 3/065 423/50 |
| 2013/0078166 A1 | 3/2013 | Luederitz et al. | |

FOREIGN PATENT DOCUMENTS

| | | | |
|---|---|---|---|
| GB | 1153717 A | * | 1/1974 |
| JP | 2006130387 A | * | 5/2006 |
| JP | 2013095979 A | * | 5/2013 |
| RU | 2440429 C1 | | 1/2012 |
| RU | 2447165 C2 | | 4/2012 |
| RU | 2448177 C1 | | 4/2012 |
| RU | 2490349 C1 | | 8/2013 |
| WO | 2014/158043 A1 | | 10/2014 |

OTHER PUBLICATIONS

Sasaki et al JP 2006130387 A. Machine translation. Published May 2006.*
Bai et al CN 103131857 A. Machine translation. Published Jun. 2013.*
Dorota Jermakowicz-Bartkowiak et al., "Poly(4-vinylpyridine) resins towards perrhenate sorption and desorption", Reactive & Functional Polymers, 2011, pp. 95-103, vol. 71.
F. E. Beamish, "On the behavior of platinum metals in mineral acids", The Analytical Chemistry of the Noble Metals, Pergamon Press Ltd.: Oxford, 1966, pp. 1-2.
International Search Report; PCT Application No. PCT/US16/58808 mailed Nov. 17, 2016.

* cited by examiner

METHOD FOR PLATINUM RECOVERY FROM MATERIALS CONTAINING RHENIUM AND PLATINUM METALS

RELATED APPLICATIONS

This application claims benefit to provisional U.S. Application No. 62/246,524, filed Oct. 26, 2015, the contents of which are incorporated herein in their entirety.

FIELD OF THE INVENTION

The present disclosure relates to hydrometallurgical methods for the isolation and recovery of platinum from rhenium-containing materials, and more particularly, from superalloys containing rhenium, platinum, and other metals. The disclosure also relates to apparatuses capable of carrying out the hydrometallurgical methods and the product streams generated from the methods and apparatuses.

BACKGROUND OF THE INVENTION

The present disclosure relates to a hydrometallurgical method for the recovery of platinum and other precious metals from complex feedstocks containing rhenium. One example of a material containing both platinum and rhenium is a class of materials called superalloys. Creep-resistant rhenium-containing nickel and cobalt base superalloys were developed to provide high temperature performance in severe environments, such as those encountered in gas turbine engines and in blades for gas turbine generators.

Rhenium confers creep resistance, i.e., resistance to plastic deformation at high temperatures, and corrosion resistance on the alloys.

As used herein, the term "superalloy" means an alloy, such as a nickel and/or cobalt base alloy, containing chromium and rhenium, and comprising one or more elements selected from tungsten, tantalum, zirconium, hafnium, molybdenum, yttrium, niobium, vanadium aluminum and platinum. A typical superalloy contains 0.5 to 7% by weight rhenium, along with a major proportion (50 to 60%) nickel and minor amounts of one or more of cobalt, chromium, aluminum, molybdenum, tantalum and tungsten (e. g. 2 to 10% of each). Virgin superalloy compositions typically do not include platinum, which may be present as an undesirable impurity that is limited by product specifications.

Investment cast turbine blades are typically made from directionally solidified and single crystal superalloys (e.g., Mar M 247, and CMSX-4). Superalloy turbine blades may be provided with a thermal barrier coat (TBC) made from a refractory oxide, such as platinum aluminide (for chemical or oxidative resistance), yttria-stabilized zirconia, or a mixture of refractory oxides. To achieve a greater temperature gradient (and ultimately higher performance and fuel economy) between the hot gases flowing over the surface of the turbine blade and the internal blade structure, it is also common to cast in place a network of internal cooling structures. These complex channels are produced during the investment casting process with the use of cores held in place with pinning wires made of platinum or other noble metals having sufficient dimensional stability and oxidation resistance at de-wax and casting temperatures. Nonlimiting examples of casting temperatures range from 1300-1600° C., and nonlimiting examples of de-waxing temperatures range from 700-1000° C.

When the component (e.g., turbine blade or vane) has reached the useful service limit for flight hours and/or cycles (e.g., 6000 cycles for a single crystal turbine blade), the component is removed from service, examined and either refurbished and put back into service or recycled into revert material. Due to the expensive and exacting nature of such high temperature superalloys, which often contain rare elements such as rhenium, hafnium, tungsten, and tantalum in significant proportions, superalloy scrap is frequently recycled with virgin metals to produce an alloy billet. However, some of these materials cannot be recycled back into the revert stream when their composition does not meet stringent specifications set by the manufacturers (e.g., because they are contaminated, in some instances with excessive platinum). These end-of-life scrap materials are more valuable for their intrinsic composition and are therefore recycled for elemental recovery, and in particular, rhenium recovery.

In some instances, the platinum contained in and on superalloy components such as turbine blades, gates, sprues, rises, and the like may have a higher value than the other elements in the scrap alloy. The source of the platinum present in the alloy may be the pinning wire used in the casting process, which may result in an alloy containing a high amount of platinum. The amount of platinum in such alloys is not limited and may be as much as, for example, 0.34 wt %, 0.5 wt %, 1 wt % or higher of platinum. Platinum can also be introduced into the alloy via the remelting of platinum-aluminide coated airfoils.

Standard industry practice is to abrasive shot peen the end-of-life airfoils with cut wire or other abrasive media to remove surface contamination. The present inventors have discovered that such treatment essentially welds and further diffuses the platinum into the base nickel alloy matrix, as locally high temperatures and pressures are formed at the collision site on the article.

Rhenium is present in these alloys and is conventionally recovered from these alloys in one of two ways—either by high temperature roasting of atomized superalloy in air or oxygen to remove rhenium as a volatile oxide, $Re_2O_7$, or by hydrometallurgical electrochemical and/or chemical digestion wherein the superalloy is completely or partially dissolved in an acidic aqueous solution depending upon the dissolution parameters. In high temperature roasting processes, platinum, if present, reports to the calcined base metal oxides and may be recovered through traditional hydrometallurgical approaches. In electrochemical or chemical digestion methods, aggressive conditions using highly acidic solutions and oxidizing agents may solubilize all or a part of the platinum contained in the alloy feedstock. As a consequence, platinum enters the rhenium recovery stream.

The rhenium in these alloys is recovered by loading into organic solvents or upon a variety of resins, most of which are weak- or strong base functionalized. Due to the similarity in chemical properties between rhenium and platinum, all or a part of the platinum follows the rhenium throughout the process. Platinum competes for loading with weak and strong base resins and decreases the effective sorption capacity of ion exchangers thereby contaminating the resin-eluted rhenium concentrate or strip liquor with platinum.

Superalloys are typically recycled to recover rhenium from the alloy composition, but conventional rhenium recycling processes do not attempt to separate and recover platinum present in minor amounts from the desired rhenium component because prior to the present invention, it was not known how to do so.

To this end, U.S. Patent Application Publication No. 2010/0126673 to Dasan et al. and U.S. Pat. No. 5,776,329 relate to the roasting process for removing rhenium from an alloy. WO2014158043 to Stroganov relates to a hydrometallurgical approach to removing rhenium from an alloy. Other conventional methods for removing rhenium from an alloy are disclosed in, for example, U.S. Pat. No. 8,956,582 to Feron et al.; U.S. Patent Application Publication No. 2003/0136685 to Stoller et al.; U.S. Patent Application Publication No. 2013/0078166 and U.S. Patent Application Publication No. 2011/0229366 to Luderitz et al; and U.S. Patent Application Publication No. 2009/0255372 to Olbrich. The contents of each of the above documents are incorporated herein by reference in their entirety. The conventional processes in the art, such as those above, suffer from the problem that they do not provide a method for easily separating small amounts of platinum that may be presented in the recycled alloy, in a form that is easily assayed.

Because such conventional hydrometallurgical recycling processes do not separate rhenium from any platinum that may be present in recycled superalloy compositions, rhenium pellets produced from hydrometallurgical recovery, which are consumed in the aerospace industry, often contain significant amounts of platinum impurity. A practical and commercially viable method for the extraction of platinum from rhenium-containing superalloys would be highly desirable.

SUMMARY OF THE INVENTION

At least the following items are disclosed herein.

Item 1 is a method of separating platinum and rhenium comprising the step of digesting an alloy feed comprising platinum and rhenium, wherein the alloy feed is not contacted with a composition comprising more than 250 ppm halides.

Item 2 is the method of item 1, wherein a step of separating resulting solids comprising platinum from resulting liquids comprising rhenium follows the step of digesting.

Item 3 is the method of item 1, wherein during the step of digestion, the alloy feed is not contacted with a composition comprising more than 100 ppm halides.

Item 4 is the method of item 3, wherein during the step of digestion, the alloy feed is not contacted with a composition comprising halides.

Item 5 is the method of item 1, wherein the step of digesting comprises contacting the alloy feed with sulfuric acid and a halide-free oxidant.

Item 6 is the method of item 5, wherein the sulfuric acid is present in an amount of 50-1000 g/L.

Item 7 is the method of item 5, wherein the halide-free oxidant is selected from the group consisting of air, ozone, oxygen, peroxide, persulfate salts, and mixtures thereof.

Item 8 is the method of item 7, wherein the halide-free oxidant is selected from the group consisting of peroxide and persulfate salts, or mixtures thereof.

Item 9 is the method of item 2, further comprising a step of recovering rhenium from the liquids comprising rhenium.

Item 10 is the method of item 2, wherein the step of separating comprises a formation of a filter cake comprising platinum, wherein a concentration of platinum in the filter cake is at least 2 times higher than a concentration of platinum in the alloy feed.

Item 11 is the method of item 10, wherein a concentration of rhenium in the filter cake is at least 50% lower than a concentration of rhenium in the alloy feed.

Item 12 is the method of item 10, further comprising a step of recovering platinum from the filter cake.

Item 13 is the method of item 12, wherein the step of recovering platinum from the filter cake comprises digesting the filter cake in an oxidizing and complexing milieu.

Item 14 is the method of item 2, further comprising a step of recovering platinum from the solids comprising platinum.

Item 15 is a method of separating platinum and rhenium comprising the steps of contacting a liquid comprising platinum and rhenium and a chelating ion exchange resin; and adsorbing the platinum onto the chelating ion exchange resin.

Item 16 is the method of item 15, further comprising, prior to the step of contacting the liquids comprising platinum and rhenium and a chelating ion exchange resin, the steps of: digesting an alloy feed comprising platinum and rhenium in a complexing ligand comprising halides in an amount sufficient to complex the platinum present in the alloy feed; and separating resulting solids from the liquid comprising platinum and rhenium.

Item 17 is the method of item 15, wherein the chelating ion exchange resin is functionalized with thiourea or thiouronium groups.

Item 18 is the method of item 15, wherein the pH of the liquid comprising platinum and rhenium is below 5.

Item 19 is the method of item 16, wherein the complexing ligand is selected from the group consisting of hydrochloric acid, a chloride containing salt, bromine and bromide salts, or chlorine.

Item 20 is the method of item 16, wherein the step of digesting further comprises digesting the alloy feed comprising platinum and rhenium in an oxidant capable of oxidizing both platinum and rhenium from their metallic zero-valence state to platinum's fourth oxidation state and rhenium's heptavalent oxidation state.

Item 21 is the method of item 20, wherein the oxidant is selected from the group consisting of peroxides, nitric acid and its salts, chlorates, chlorine, HCl, sulfuric acid, sodium chlorite, acids, oxygen, air, and mixtures thereof.

Item 22 is the method of item 21, wherein the oxidant is chlorate or a mixture of HCl and sulfuric acid.

Item 23 is the method of item 21, wherein the oxidant is sodium chlorite and an acid.

Item 24 is the method of item 16, wherein a concentration of rhenium and/or platinum in the resulting solids is from 50 to 100% lower than a concentration of rhenium and/or platinum in the alloy feed.

Item 25 is the method of item 24, wherein a concentration of rhenium and/or platinum in the resulting solids is from 90 to 100% lower than a concentration of rhenium and/or platinum in the alloy feed.

Item 26 is the method of item 25, wherein a concentration of rhenium and/or platinum in the resulting solids is from 99 to 100% lower than a concentration of rhenium and/or platinum in the alloy feed.

Item 27 is the method of item 15, further comprising, prior to the step of contacting a liquid comprising platinum and rhenium and a chelating ion exchange resin, a step of decreasing an oxidative reduction potential value of the liquid comprising platinum and rhenium.

Item 28 is the method of item 27, wherein the step of decreasing an oxidative reduction potential value of the liquid comprising platinum and rhenium comprises adding reducing agents to the liquid comprising platinum and rhenium.

Item 29 is the method of item 28, wherein the reducing agents are capable of reducing platinum (IV) to platinum (II) without affecting the oxidation state of rhenium in solution (Re(VII)).

Item 30 is the method of item 29, wherein the reducing agents comprise sulfites, sulfur dioxide gas, or $N_2H_4$ salts.

Item 31 is the method of item 29, wherein the reducing agents comprise anhydrous sulfur dioxide, or a salt thereof, ascorbic acid, ethanol, or hydroxylamine hydrochloride.

Item 32 is the method of item 27, wherein the step of decreasing an oxidative reduction potential value of the liquids comprising platinum and rhenium comprises treating the liquid comprising platinum and rhenium with sulfur dioxide gas.

Item 33 is the method of item 15, further comprising, following the step of contacting the liquid comprising platinum and rhenium and a chelating ion exchange resin, obtaining a liquid stream comprising a higher relative concentration of rhenium to platinum than a relative concentration of rhenium to platinum in the liquids comprising platinum and rhenium.

Item 34 is the method of item 15, wherein at least 60% of the platinum present in the liquid comprising platinum and rhenium are adsorbed onto the chelating ion exchange resin.

Item 35 is the method of item 34, wherein at least 90% of the platinum present in the liquids comprising platinum and rhenium are adsorbed onto the chelating ion exchange resin.

Item 36 is the method of item 35, wherein at least 99% of the platinum present in the liquids comprising platinum and rhenium are adsorbed onto the chelating ion exchange resin.

Item 37 is the method of item 15, wherein less than 10% by weight of rhenium is adsorbed onto the chelating ion exchange resin, relative to the amount of platinum adsorbed onto the chelating ion exchange resin.

Item 38 is the method of item 37, wherein less than 1% by weight of rhenium is adsorbed onto the chelating ion exchange resin, relative to the amount of platinum adsorbed onto the chelating ion exchange resin.

Item 39 is the method of item 38, wherein less than 0.1% by weight of rhenium is adsorbed onto the chelating ion exchange resin, relative to the amount of platinum adsorbed onto the chelating ion exchange resin.

Item 40 is the method of item 15, further comprising a step of recovering the platinum adsorbed onto the chelating ion exchange resin.

Item 41 is a system that separates platinum and rhenium comprising an alloy feed comprising platinum and rhenium undergoing digestion in a composition comprising more than 250 ppm halides.

Item 42 is the system of item 41, wherein the composition comprises more than 100 ppm halides.

Item 43 is the system of item 42, wherein the composition comprises no halides.

Item 44 is the system of item 41, wherein the composition comprises sulfuric acid and a halide-free oxidant.

Item 45 is the system of item 44, wherein the composition comprises the sulfuric acid in an amount of 50-1000 g/L.

Item 46 is the system of item 44, wherein the halide-free oxidant is selected from the group consisting of air, ozone, oxygen, peroxide, persulfate salts, and mixtures thereof.

Item 47 is the system of item 46, wherein the halide-free oxidant is selected from the group consisting of peroxide and persulfate salts, or mixtures thereof.

Item 48 is the system of item 41, comprising a filter cake comprising platinum, wherein a concentration of platinum in the filter cake is at least 2 times higher than a concentration of platinum in the alloy feed.

Item 49 is the system of item 48, wherein a concentration of rhenium in the filter cake is at least 50% lower than a concentration of rhenium in the alloy feed.

Item 50 is the system of item 48, further comprising platinum recovered from the filter cake.

Item 51 is the system of item 41, further comprising platinum recovered from the alloy feed after digestion.

Item 52 is a system that separates platinum and rhenium comprising a liquid comprising platinum and rhenium; a chelating ion exchange resin; and platinum from the liquid comprising platinum and rhenium adsorbed onto the chelating ion exchange resin.

Item 53 is the system of item 52, further comprising, prior to the chelating ion exchange resin: an alloy feed comprising platinum and rhenium undergoing digestion in a complexing ligand comprising halides in an amount sufficient to complex the platinum present in the alloy feed; and a resulting separate streams of solids and the liquid comprising platinum and rhenium.

Item 54 is the system of item 52, wherein the chelating ion exchange resin is functionalized with thiourea or thiouronium groups.

Item 55 is the system of item 52, wherein the pH of the liquid comprising platinum and rhenium is below 5.

Item 56 is the system of item 53, wherein the complexing ligand is selected from the group consisting of hydrochloric acid, a chloride containing salt, bromine and bromide salts, or chlorine.

Item 57 is the system of item 53, wherein the alloy feed comprising platinum and rhenium undergoing digestion is also digested in an oxidant capable of oxidizing both platinum and rhenium from their metallic zero-valence state to platinum's fourth oxidation state and rhenium's heptavalent oxidation state.

Item 58 is the system of item 57, wherein the oxidant is selected from the group consisting of peroxides, nitric acid and its salts, chlorates, chlorine, HCl, sulfuric acid, sodium chlorite, acids, oxygen, air, and mixtures thereof.

Item 59 is the system of item 58, wherein the oxidant is chlorate or a mixture of HCl and sulfuric acid.

Item 60 is the system of item 58, wherein the oxidant is sodium chlorite and an acid.

Item 61 is the system of item 53, wherein a concentration of rhenium and/or platinum in the resulting stream of solids is from 50 to 100% lower than a concentration of rhenium and/or platinum in the alloy feed.

Item 62 is the system of item 61, wherein a concentration of rhenium and/or platinum in the resulting stream of solids is from 90 to 100% lower than a concentration of rhenium and/or platinum in the alloy feed.

Item 63 is the system of item 62, wherein a concentration of rhenium and/or platinum in the resulting solids is from 99 to 100% lower than a concentration of rhenium and/or platinum in the alloy feed.

Item 64 is the system of item 52, wherein the liquid comprising platinum and rhenium further comprises reducing agents.

Item 65 is the system of item 64, wherein the reducing agents are capable of reducing platinum (IV) to platinum (II) without affecting the oxidation state of rhenium in solution (Re(VII)).

Item 66 is the system of item 64, wherein the reducing agents comprise sulfites, sulfur dioxide gas, or $N_2H_4$ salts.

Item 67 is the system of item 64, wherein the reducing agents comprise anhydrous sulfur dioxide, or a salt thereof, ascorbic acid, ethanol, or hydroxylamine hydrochloride.

Item 68 is the system of item 52, wherein the liquid comprising platinum and rhenium has been treated with sulfur dioxide gas.

Item 69 is the system of item 52, further comprising a liquid stream comprising a higher relative concentration of rhenium to platinum than a relative concentration of rhenium to platinum in the liquids comprising platinum and rhenium, which is obtained after platinum from the liquid comprising platinum and rhenium has been adsorbed onto the chelating ion exchange resin.

Item 70 is the system of item 52, wherein the chelating ion exchange resin has adsorbed at least 60% of the platinum present in the liquid comprising platinum and rhenium.

Item 71 is the system of item 70, wherein the chelating ion exchange resin has adsorbed at least 90% of the platinum present in the liquids comprising platinum and rhenium.

Item 72 is the system of item 71, wherein the chelating ion exchange resin has adsorbed at least 99% of the platinum present in the liquids comprising platinum and rhenium.

Item 73 is the system of item 52, wherein the chelating ion exchange resin has adsorbed less than 10% by weight of rhenium relative to the amount of platinum adsorbed onto the chelating ion exchange resin.

Item 74 is the system of item 73, wherein the chelating ion exchange resin has adsorbed less than 1% by weight of rhenium relative to the amount of platinum adsorbed onto the chelating ion exchange resin.

Item 75 is the system of item 74, wherein the chelating ion exchange resin has adsorbed less than 0.1% by weight of rhenium relative to the amount of platinum adsorbed onto the chelating ion exchange resin.

Item 76 is the system of item 52, further comprising platinum recovered from the platinum adsorbed onto the chelating ion exchange resin.

DETAILED DISCLOSURE OF THE INVENTION

Figure 1:
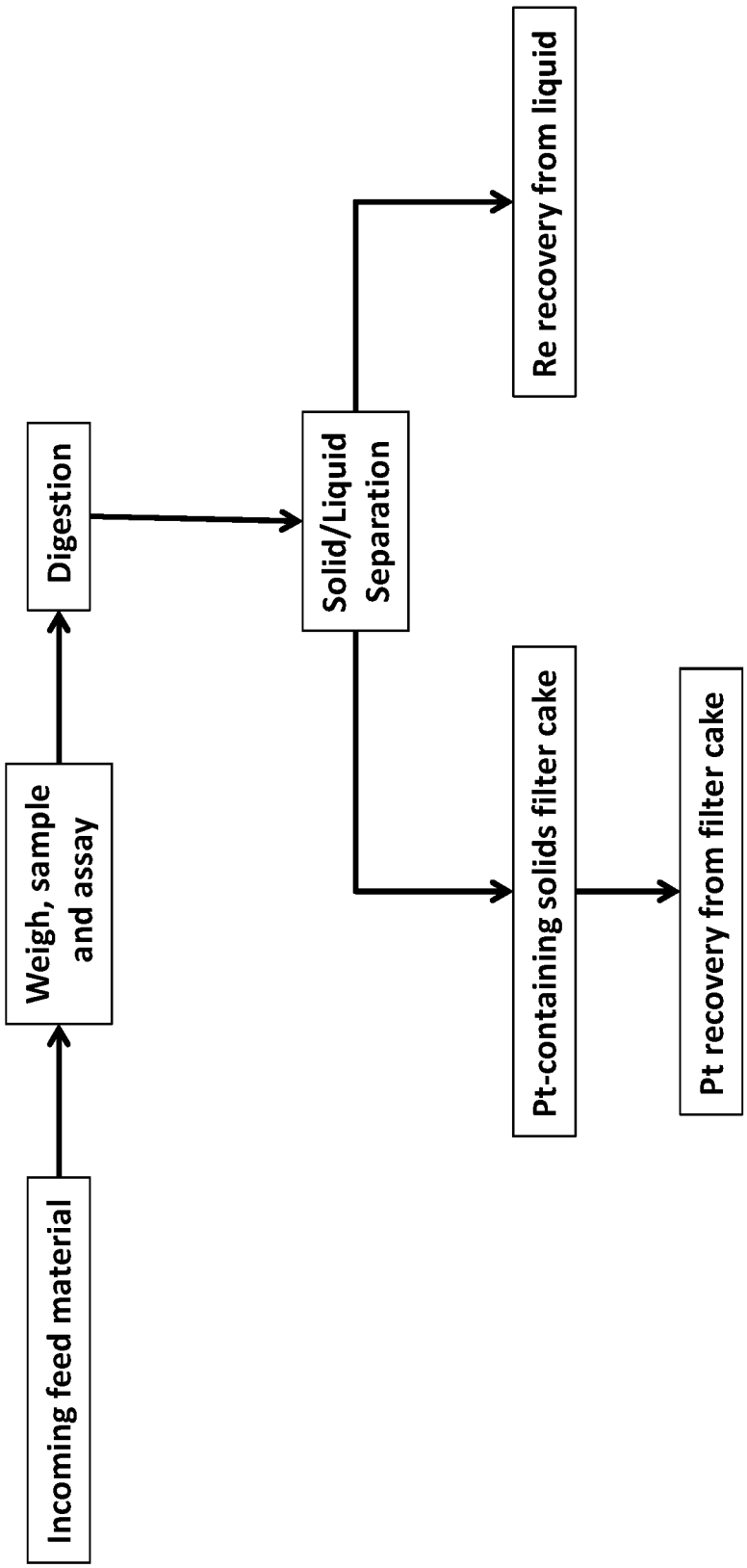
FIG. 1 is a schematic illustration of a process according to an embodiment of the present disclosure, in which platinum is separated from rhenium as part of an insoluble solids residue.

The present disclosure is based on the discovery of an efficient and effective method for selectively recovering platinum from rhenium-containing materials. The method is able to efficiently recover platinum from a variety of rhenium-containing materials containing other metals such as nickel, cobalt, chromium, tungsten, tantalum, zirconium, hafnium, molybdenum, yttrium, niobium, and aluminum.

As used herein, the term "platinum" may include platinum and other elements of the platinum metal family.

A rhenium-containing material is any material that contains Rhenium (Re). This includes waste, residue, ore, ore concentrate, byproduct, processed, and/or unprocessed material. Rhenium-containing materials include nickel, cobalt, and/or molybdenum-containing manufacturing sludge residues, wastes, and byproducts. These materials have a physical consistency of a powder, sand or sludge and are typically comprised of metal compounds, metal alloys, metal grinding polishing fines, etchant compounds, and mixtures thereof. Rhenium containing materials also include granular filter media, fibrous filter media, abrasive grinding material and plasma deposition overspray particles. In one aspect of this disclosure, the rhenium-containing material is a superalloy waste, sludge, byproduct, or residue resulting from the manufacturing and/or subsequent repair of high-temperature industrial turbines, turbine components, superconductor components, vacuum plasma metal deposition processes, and bimetallic reforming catalyst materials.

The present disclosure is illustrated herein with reference to rhenium-containing superalloys, but the disclosed embodiments can be applied more broadly to any rhenium-containing material that also contains platinum, alone or in combination with other metals.

The method according to the present disclosure permits the efficient and commercially viable separation and recovery of platinum from rhenium-containing materials, including superalloys in which the platinum is present in a small amount relative to rhenium, e.g., in a weight ratio of Pt:Re from about 0.002 to about 0.5. However, the concentrations of rhenium and platinum present in the materials, and their ratio to one another, is not particularly limited, and the presently disclosed methods may be used to separate platinum from rhenium-containing materials in which these materials are present in either large or small quantities. In conventional rhenium recovery methods, it is difficult to separate such small amounts of platinum from materials containing rhenium, in order to avoid contamination of the final product. The present disclosure enables the recovery of substantially pure rhenium and substantially pure platinum from alloys containing a mixture of these and other metals.

The present method provides for the isolation of platinum from an alloy containing platinum and rhenium, in which the platinum and/or rhenium that is produced does not contain more than 10% by weight, more preferably not more than 5% or 1% by weight, and most preferably not more than 0.1% by weight of any other metal. In preferred embodiments the present method provides for the isolation of platinum from an alloy containing platinum and rhenium, in which the platinum and/or rhenium that is produced does not contain more than 10% by weight, more preferably not more than 5% or 1% by weight, and most preferably not more than 0.1% by weight of any other material.

The present disclosure also includes the systems and parts and subparts of the systems that achieve the methods disclosed herein. The systems herein may include both the alloys and processed alloys herein, as well as the intermediate products disclosed herein. The systems may also include the physical and chemical apparatuses necessary to carry out the methods disclosed herein. Where disclosures of materials and/or apparatuses are made herein, it should be understood that such disclosures also disclose the corresponding systems.

The phrase "substantially pure" means that material such as platinum has a purity of about 90-99.9% by weight. The term "substantially free" of a material such as platinum similarly means that a compound or composition contains no more than about 0.1-10% by weight of the material such as platinum.

Preparation of Metallic Feed

In preferred embodiments of the present method, an alloy containing rhenium, platinum and other metals is provided in a finely divided particulate form having a particle size range of about 2 microns to 300 microns, and preferably from about 20 microns to 200 microns. The particulate form is preferably atomized. In general, lower the average particle sizes, and higher relative surface areas provide for faster digestion. In other exemplary embodiments, an alloy containing rhenium, platinum and other metals can be provided as larger pieces, for example, having a length of from about 5 cm to about 13 cm and an average cross-sectional dimension of about 1.3 cm. In such embodiments, the large pieces may have a volume of about 20 cm$^3$ to about 100 cm$^3$.

In a preferred embodiment, a feed containing one or more of nickel, cobalt, vanadium, aluminum, titanium, hafnium, yttria, zirconium, tantalum, tungsten, chromium, molybdenum, rhenium and platinum (such as CMSX-4 alloy from jet turbine scrap manufacturing) is granulated or atomized to produce a homogeneous feedstock having a higher surface area, thereby providing for superior digestion kinetics. In this preferred embodiment, the granulated superalloy feed is present in finely divided particulate form, in which the average particle size/diameter may be, for example, about 2 to about 300 microns, and more preferably about 20 to about 200 microns. The powder may, for example, have an average surface area of about 10-50 m$^2$/g. The surface area is understood to be contingent on the morphology of the particle. As an example, spherical or spheroid particles will have a minimized surface area to volume ratio, whereas flakey particles will have higher surface area to volume ratios.

The material may be sampled and analyzed for platinum, rhenium, and other elements of interest by total dissolution and gravimetric and spectroscopic analyses (e.g., NiS fire assay, and ICP-OES or ICP-MS) familiar to those versed in the art. The manner of conducting this analysis is not particularly limited, and any method known in the art may be used. The feed in this embodiment is not limited, and persons skilled in the art will appreciate that the present process may be suitably applied to diverse feeds that may be treated with the embodiments disclosed herein, including without limitation those containing platinum and rhenium in any proportion, alone or in combination with other elements and compounds.

Digestion of the Metallic Feed

In hydrometallurgical processes according to the present disclosure, the feed material containing rhenium and platinum is digested by subjecting the feed to strongly oxidizing conditions in an aqueous acidic solution, under conditions that are chosen to partially or completely dissolve platinum, rhenium, and other metals present in the material or alloy.

The term "digest" as used herein means to wash, extract, or perform a chemical reaction to separate a soluble element or compound from an insoluble or relatively less soluble material. The phrase "insoluble material" means an element in free form or a compound that is incapable of dissolving in a particular solvent, or that dissolves to a limited extent, e.g., less than about 5%, or which dissolves and then reprecipitates in the particular solvent, such as tungsten, which may dissolve in certain $H_2O_2$ systems to form soluble tungsten compounds, but those tungstic compounds then reprecipitate.

In the digestion step, the alloy granulate or atomizate may be charged into a reactor of suitable construction to withstand the temperature and corrosive environments of the digestion and sufficient capacity to contain the solid and liquid charge. A suitable reactor may be fiberglass reinforced plastic, a glass lined reactor, or a tantalum lined reactor, permitting the digestion conditions to be regulated from room temperature and atmospheric pressure to temperatures at or exceeding the boiling point of the reagent mixture at pressures ranging from about 1 bar to about 10 bar. The selection of the dissolution chemistry dictates the pressures and temperatures employed.

In an exemplary embodiment, when the feedstock is an alloy that is finely divided into particles having, an average size/diameter range of about 2 microns to 300 microns, the atomized particles are advantageously subjected to strongly oxidizing conditions in an aqueous acidic solution at temperatures of from about 30° C. to about 80° C., preferably from about 60° C. to about 80° C. and for a time period, which may range from about 1 hour to about 12 hours. If the feedstock material containing platinum and rhenium consists of larger pieces, such as pieces having a volume of about 20 cm$^3$ to about 100 cm$^3$, the feedstock is preferably subjected to strongly oxidizing acid conditions at temperatures of from about 40° C. to about 80° C. for a time period of from about 2 days to about 10 days.

The feedstock solids content in the oxidizing acid solution is preferably from about 5% to about 20% by volume, and more preferably from about 10% to about 15% by volume. More concentrated solutions are preferable to the extent they do not interfere with downstream processing.

In the digestion step of hydrometallurgical processes according to an embodiment, the pH of the oxidizing aqueous solution and the oxidation reduction potential (ORP) of the solution are selected to selectively dissolve relatively more soluble components or elements of the feedstock in the solution, in order to separate these elements from relatively less soluble elements, or elements that are insoluble in the oxidizing aqueous solution. When the feedstock is an atomized superalloy containing platinum and rhenium, the pH of the oxidizing solution is preferably from about pH <0 to pH 1.5, most preferably from about <pH 0 to 0.5.

Embodiment 1

In a first embodiment, platinum is recovered in solid form while rhenium is dissolved in an oxidizing solution. In the first embodiment, the platinum present in a material such as a superalloy may be selectively separated from the rhenium such that the platinum remains in the insoluble digestion residues comprised of refractory metal oxides, SiC, hydroxides, and polyacids (e.g., tungstic acid and molybdic acid, hafnium oxides, tantalum metal and pentoxide, titanium (IV) oxide, zirconium (IV) oxide) and the solvated rhenium is dissolved in the aqueous acidic base metal stream. Platinum may be present in the insoluble residues in the form of metallic platinum. The aqueous base metal stream typically contains transition metals such as Ni, Co, Cr, Al as their sulfate salts.

Referring to FIG. 1, an incoming feed material containing platinum is provided. The incoming feed material may be homogenized by, for example, being induction melted, preferably under vacuum or an inert gas blanket so as to preserve the rhenium from volatilization. The incoming feed material may be granulated or atomized, so as to increase the surface area, thereby potentially providing for faster dissolution and/or digestion. The incoming feed material may be, for example, CMSX-4 or Mar M 247.

Again referring to FIG. 1, the incoming feed material may be weighed, sampled, and assayed. In this step of the method, the feed material is representatively sampled. The sample may be solubilized via total digestion in a fluoropolymer pressure bomb with microwave-assisted pressure digestion (for example, in a solution of 3:1:0.5 concentrated HF:concentrated HNO$_3$:concentrated HCl). In this step, platinum and any other elements of interest may be analyzed by, for example, inductively coupled plasma optical emission spectroscopy or mass spectroscopy (ICP-OES or ICP-MS), or other known methods. In this step of the method, all elements in the feed material may be dissolved, including but not limited to the platinum.

Referring to FIG. 1, the feed material is provided into a reactor for digestion. Water containing no halides (e.g., $Cl^-$, $Br^-$, $I^-$, or $F^-$) is added to the reactor in an amount sufficient to ensure the solubility of the sulfate salts subsequently produced. Next, portions of sulfuric acid or phosphoric acid and any suitable halide-free oxidant (e.g., hydrogen peroxide, or nitric acid) is added to begin the reaction. Suitable concentrations in this step may include, for example, 50-1000 g/L of, e.g., $H_2SO_4$. Other halide-free oxidants include, without limitation, for example, air, ozone, oxygen, peroxide, and persulfate salts, and mixtures thereof. To prevent the formation of hydrogen gas, the ORP should be maintained at or above 100 mV, as discussed below. Further, to fully solubilize the rhenium into solution as Re(VII), the ORP should be over 600 mV, and preferably over +800 mV. After the initial exotherms of dilution and reaction subside, heat is applied so as to maintain the temperature at or within, preferably, 10° C. of the boiling point of the acid mixture until the Re(VII) plateaus and the acid-soluble materials dissolve. Other suitable temperatures for this reaction include, for example 25-150° C. By avoiding the inclusion of halides in this step, zero-valence elemental platinum remains in the filter cake. In certain embodiments, all of the platinum present in the filter cake is zero-valence elemental platinum. In this respect, if halides are used in the step of digestion, such use should not preclude that at least some portion of the Pt remains in the filter cake. To this end, the amount of halides used in the step of digestion is preferably less than 250 ppm, more preferably less than 100 ppm, and most preferably none. In a preferred embodiment, the digestion process is substantially free or free of halides. If halides are used in this step, it is understood that the amount of platinum recovered in the filter cake may be adversely affected.

The digestion step in the first embodiment is preferably performed in an acidic oxidizing solution without the addition of halides that may solubilize or complex the platinum. Platinum will not solubilize without complexing and oxidizing environments. Halides, such as chloride, bromide, and iodide constitute complexing ligands capable of maintaining platinum in aqueous solution as a di- or tetravalent salt or complex.

To preclude the formation of inflammable hydrogen gas, the ORP of the dissolution mixture is preferably maintained from about +500 mV to about 1000 mV, and most preferably from about +800 mV to about 1000 mV, relative to Ag/AgCl.

As described above, sulfuric acid, in concentrations ranging from about 50-1000 g/L may be used as the acid, and preferably hydrogen peroxide, oxygen, ozone, or another oxidant not providing a complexing halide (e.g., $Cl^-$, $Br^-$, $I^-$) may be used. More or less reagent may be required. Preferably the method is carried out at a sulfuric acid concentration of about 4-6 mole/liter, at a ratio of the acid to the granulated alloy of about (2-10):1 by volume, and a temperature of about 60° C.

In an alternate aspect of the present embodiment, electrochemical digestion may be used in addition to or instead of acid digestion, if complexing media are not present as discussed above.

Referring to FIG. 1, the slurry formed in the digestion step is then separated into solids and liquids (e.g., soluble and insoluble) portions. Within the slurry, the rhenium may form perrhenic acid ($HReO_4$) and nonrefractory base metals may form their acid sulfates (including, but not limited to $Ni(SO_4)_2$, $Co(SO_4)_2$, $Al_2(SO_4)_3$, and the like), each of which dissolve in and are part of the aqueous (liquid) stream. That stream is separated from the insoluble platinum-containing digestion residues via centrifugation, decantation, filter pressing or any other means of effecting a solid-liquid separation.

As shown in FIG. 1, the rhenium-containing stream or liquor, which is preferably substantially platinum free, may then be passed through a conventional weak base resin column system or a solvent extraction system so as to selectively sorb and recover the rhenium by known methods. Known methods of recovering rhenium from such streams may be used, including but not limited to ion exchange, solvent extraction, precipitation, and the like. An example of the recovery of rhenium with Purolite A170 weak base-functionalized macroporous resin is as follows: 1000 L of a filtered (<1 um suspended solids), acidic (pH 0.5) aqueous sulfuric acid solution of ORP (550 mV) containing nickel, cobalt, aluminum, chromium and rhenium at 900 ppm was passed through three ion exchange beds containing 1.5 cubic feet (1 cu ft nonswollen) of anion exchange resin Purolite A170. The aspect ratio of each column was 1:6 and each was comprised of clear PVC pipe having each end configured such that the resin could be removed for sampling. The rhenium-containing solution was circulated through the resin columns at the rate of 3 BV/h (or 127 liters/hour; bed size being 1.5 cubic feet). Molybdenum had been previously removed from the aqueous stream prior to contacting the A170 with Purolite S957 Strong Acid Cation Resin. All loading, rinsing, and elution were conducted at room temperature. The resin was washed with 3 BV of 5% w/v aqueous sulfuric acid for one hour to remove base metals, then 3 BV of deionized water to remove acidity from the resin. The rhenium outflow from the lag (final) column was less than 5 ppm indicating that full loading/breakthrough of the columns had not yet been achieved. The resin was further loaded in subsequent runs and stripped with 3 mol/liter aqueous ammonia to produce a dilution solution of ammonium perrhenate suitable for further workup.

Referring to FIG. 1, after being separated, a platinum-containing insoluble filter cake is obtained. In addition to platinum, the insoluble filter cake may also include, for example, W, Ta, Zr, Hf, Mo, and the like. A typical example of the composition of such a filter cake from the digestion of CMSX-4 is seen in Table 1. An advantage to forming an insoluble filter cake in this manner is that the separation results in the removal of a majority, e.g., 80-90% by weight, of the non-precious or non-refractory metals (e.g., not Pt, Ta, W, and the like) present in the initial process stream, and the resulting filter cake therefore has a relative concentration of Pt that is much higher, e.g., at least about 7 times, preferably about 7-10 times higher, than the initial process stream. The separation may remove 50-90% by weight of the non-precious metals (such as, e.g., Ni, Co, and Re), preferably 60-95% by weight, more preferably 70-99% by weight, and most preferably 80-99% by weight or all of the non-precious metals. The relative concentration of Pt in the resulting filter cake may be from about 2 to about 12 higher than the initial process stream, and in particular embodiments may be at least about 5, at least about 7, or at least about 9 times to about 12 times more concentrated. A leached filter cake may contain from about 20 to about 100 ppm Pt.

The concentration of rhenium in the resulting filter cake may be from about 50 to about 100% lower than the initial process stream, and in particular embodiments may be at least about 80, at least about 90, at least about 95, at least about 99, or at least about 99.5 percent less. It is preferable that the filter cake is free from or substantially free from rhenium.

The filter cake may be then be processed to yield a solution of, for example, chloroplatinic acid from which platinum or other platinum group materials may be recovered. For example, the insoluble residues or filter cake, preferably containing substantially all of the platinum, may be treated with oxidizing and complexing media under strongly acidic conditions (preferably at a pH of 1 or below) with nitric acid, chlorine, hydrogen peroxide, or any other oxidant capable of maintaining an ORP at or above about +750 mV, and preferably above about +1000 mV. The acid(s) used are not particularly limited as long as a sufficient amount of halide is present (preferably at least a stoichiometric equivalent) to complex the platinum (or other platinum group metal (PGM)) and draw it into solution as a halegenoplatinate anionic complex of the form $[PtX_6]^{2-}$ or, if in the bivalent state $[PtX_4]^{2-}$ where X constitutes a halogen (e.g., Cl, Br, or I). The substantially rhenium-free and/or base metal free digestion slurry containing platinum may be separated from insoluble solids and the platinum is recovered via complex salt precipitation, ion exchange, electrowinning, cementation, or the like. Known methods of digestion may also be used in this step. The duration of the digestion can be varied, depending upon the alloy, its specific surface area, and the concentration of reagents and temperature and pressure employed.

In another aspect, the insoluble residue so obtained may be subjected to a second digestion with aqua regia or other oxidizing and complexing milieu that solubilizes, in part, or preferably in whole, the partitioned platinum remaining. This platinum-containing solution is then filtered and the platinum or platinum group metal recovered via precipitation, solvent extraction, ion exchange, to name but a few methods.

It is noted that the specific processing conditions of FIG. 1 are illustrative only, and do not limit the scope of the disclosure of FIG. 1.

Embodiment 2

In a second embodiment of the disclosed process, platinum is recovered following codissolution with rhenium. In this embodiment the digestion may be affected with a mixture of acids and oxidants and complexing agents (e.g., halides) to fully solubilize the platinum and rhenium, along with nonrefractory transition metals such as Ni, Co, Cr, and V as their sulfate/chloride salts and complexes.

Figure 2:
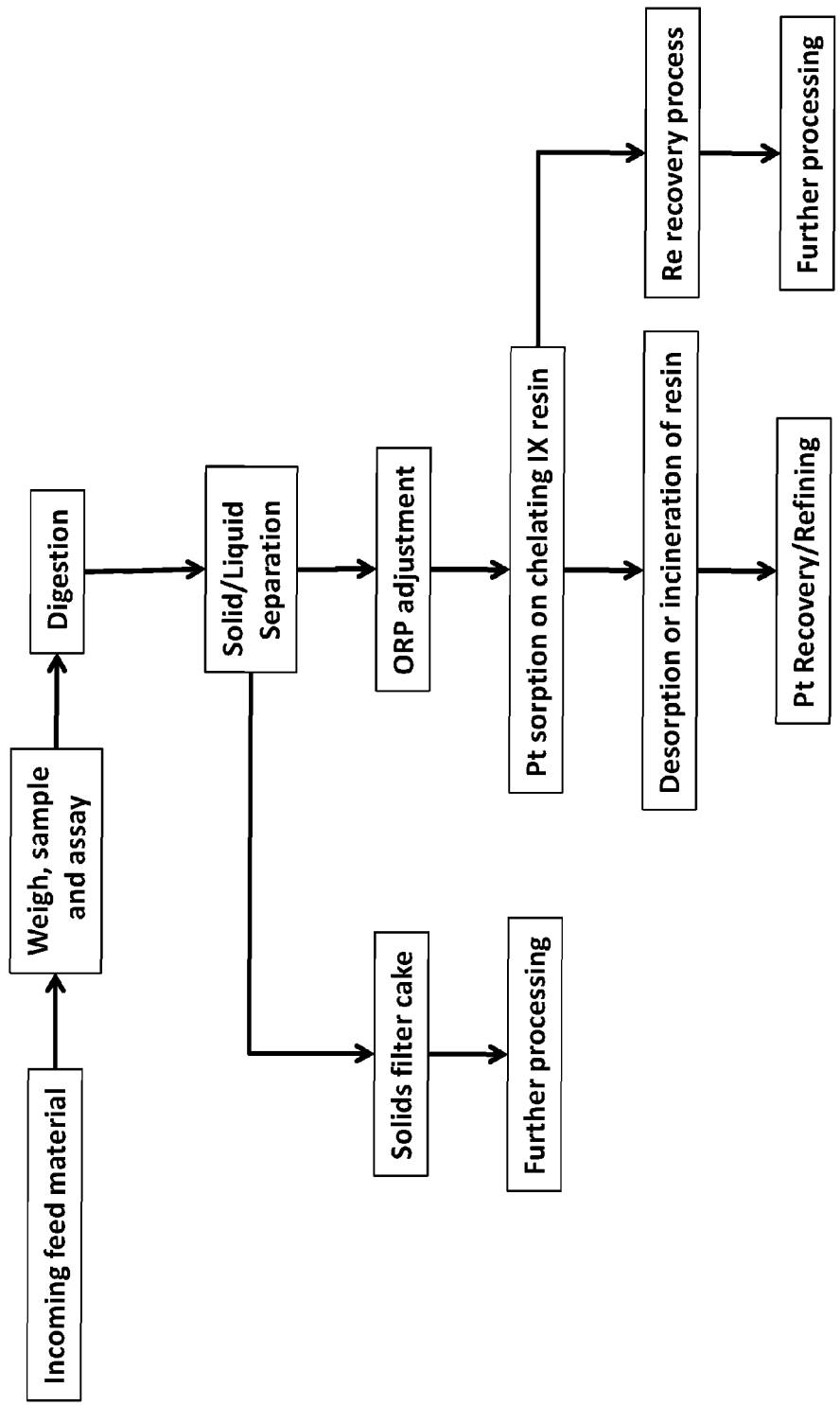
FIG. 2 is a schematic illustration of a process according to another embodiment of the present disclosure, in which platinum and rhenium are co-dissolved and separated from insoluble solids.

Referring to FIG. 2, in the second embodiment, the incoming feed material and the step of weighing, sampling, and assaying the feed material may be carried out as described above with respect to the first embodiment.

With reference to the step of digestion shown in FIG. 2, in the second embodiment both platinum and rhenium are dissolved. This is accomplished by charging the feedstock into a reactor that is physically and chemically compatible with the reaction milieu, subject to constraints similar to the first embodiment. In this embodiment, a complexing ligand in quantity sufficient to complex the platinum contained in the solution (e.g., at least about a 10% excess of halide so as to produce $[PtCl_6]^{2-}$) is used in the acidic digestion matrix. Preferred reagents are hydrochloric acid, a chloride containing salt, bromine and bromide salts, or chlorine, or mixtures thereof. If digestion is conducted at atmospheric pressure, it is preferable to add the feedstock to an excess of the reagent; if digestion is conducted under pressure, it is preferable to add an oxidant, discussed below, to the feedstock and acid mixture. In such a fashion, the rate of reaction and other parameters such as ORP, pH, and temperature may be more easily controlled.

During digestion, an oxidant capable of oxidizing both platinum and rhenium from their metallic zero-valence state to their fourth (Pt) and heptavalent (Re) oxidation state, respectively, may be used. Suitable oxidants for use in the digestion step include, for example, peroxides, nitric acid and its salts, chlorates, chlorine, oxygen, air, or any other conventional oxidizer capable of maintaining the ORP at or above the prescribed level for full solubilization of platinum, or mixtures thereof. In a preferred embodiment sodium chlorate is the oxidant, which oxidizes the chloride in HCl to chlorine, which solubilizes the Pt and the Re. Another preferred embodiment utilizes a mixture of HCl and sulfuric acid and an oxidant. Another preferred embodiment utilizes sodium chlorite, an oxidant, and an acid.

The ORP of the solution may be maintained during digestion at about +700 mV to about 1200 mV, preferably from about +800 mV to about 1100 mV, and more preferably from about +900 mV to about 1000 mV to ensure complete digestion of the platinum from the feedstock.

The platinum content in the digestion solution may be monitored by ICP-OES or other appropriate analytical method. Digestion may be terminated upon achieving a plateau in Pt(IV) concentration, or upon reaching a predetermined concentration. When a plateau in Pt(IV) concentration is reached, substantially all of the metallic platinum present in the feedstock has been converted to soluble Pt(IV) salt forms, such as, but not limited to chloroplatinic acid (IV) or chloroplatinous acid (II). It is understood that if the platinum concentration is at a steady state, so too is the rhenium concentration (e.g., rhenium dissolves before and during the dissolution of platinum, not after). If the amount of platinum in solution corresponds to the amount of platinum measured by assay, it may be presumed that all of the rhenium has also been brought into solution.

Referring to FIG. 2, the slurry formed in the digestion step is then separated into solids and liquids (e.g., soluble and insoluble) portions. The process liquid stream may be separated from the solid residue using a suitable method for liquid/solid separation effective to produce a liquid stream containing, e.g., substantially all of the base metals and platinum and rhenium in their highest typical oxidation states (e.g., Ni(II), Cr(VI), Co(II), Pt(IV), Re(VII), Mo(VI), Al(III)) and a solid residue comprised of e.g., refractory metals and their respective oxides. The solids-free solution may then be sampled and assayed.

Referring to FIG. 2, a solids filter cake may be obtained from the insoluble portion of the slurry. This portion of the slurry may include, for example, W, Ta, Hf, Zr, some or all of the Mo, and other elements. The filter cake may be dried and then subjected to further processing to, for example, isolate elements of interest. The concentration of rhenium and/or platinum in the resulting filter cake may be from about 50 to about 100% lower than the initial process stream, and in particular embodiments may be at least about 80, at least about 90, at least about 95, at least about 99, or at least about 99.5 percent less. It is preferable that the filter cake is free from or substantially free from rhenium and platinum.

Referring to FIG. 2, solutions having high ORP values are potentially damaging and destructive to solvent extraction reagents, ion exchange resins, and other downstream processes. To improve downstream operations, it is advantageous to perform, after solid/liquid separation, an ORP adjustment step on the liquid stream. The liquid stream in this embodiment may include Re Pt, and, potentially, base metal salts. Such a step may be carried out using as reducing agents, for example, sulfites, sulfur dioxide gas, or another reductant (e.g., $N_2H_4$ salts) capable of reducing platinum (IV) to platinum (II) without affecting the oxidation state of rhenium in solution (Re(VII)). Preferred reducing agents include anhydrous sulfur dioxide, or a salt thereof, and other reducing agents may also be used, including but not limited to ascorbic acid, ethanol, hydroxylamine hydrochloride, and the like. This step will lower the ORP of the solution, preferably to about 700 mV or less, more preferably about 600 mV or less, even more preferably to about 500 mV or less, and most preferably to about 380-480 mV or less relative to Ag/AgCl to convert Pt(IV) to Pt(II) and protect downstream processes from excessively oxidizing solutions, which may damage, e.g., the chelating ion exchange resins. In a preferred aspect of the present disclosure, this action may be achieved by treating the solution obtained with sulfur dioxide gas until the desired ORP is achieved. Such a reaction is quick and the byproduct is sulfuric acid. In addition, if nitric acid is present in the dissolution mixture, the treatment step eliminates its presence. The reduction process may also serve to reduce hexavalent chromium to Cr(III).

The solution, having an ORP adjusted to this range, may then be sent to a platinum recovery circuit. FIG. 2 illustrates an embodiment in which the platinum is removed from the hydrometallurgical process stream prior to rhenium removal. The process stream containing metals including, for example, platinum (II) and rhenium (preferably rhenium (VII)) is first passed through a chelating ion exchange resin, which may be functionalized with thiourea or thiouronium groups. Examples of such commercially available resins include PUROLITE S920, PUROLITE S914, LANXESS LEWATITE MONOPLUS TP 214, and Dow Chemical® DOWEX 43600.00, among other suitable commercially available resins. Particularly preferred resins are PUROLITE S920 or S914, or LANXESS LEWATITE MONOPLUS TP 214.

The solution, during the step of passing it through or contacting it with a chelating ion exchange resin, preferably has a pH of 5 or below in acidity, and the platinum loads to the resin preferentially over rhenium. The effect of the preferential loading of the platinum is a net concentration increase of rhenium, based on the initial concentration of the rhenium in the acidic solution, while incurring only a minimal impact on the rhenium units in the solution.

The chelating ion exchange resin may remove any amount of Pt, for example, at least 10-100% by weight of the Pt present in the liquid stream, preferably at least 60-95% by weight, more preferably at least 70-99% by weight, and most preferably at least 80-99% by weight or all of the Pt. It is preferable that the chelating ion exchange resin removes less than about 10% by weight of rhenium, preferably less than 5% by weight, more preferably less than 1% by weight, and most preferably less than 0.1% by weight of rhenium relative to the weight of platinum that is removed (e.g., adsorbed onto the chelating ion exchange resin). Preferably, the chelating ion exchange resin is free or substantially free from adsorbed rhenium. Following exposure to the chelating ion exchange resin, the relative concentration of Re to Pt in the resulting liquid stream may be increased proportionally to the amount of Pt removed.

In this embodiment, the platinum-rhenium containing digestion liquors containing acid-soluble base metals are first pumped through an ion exchange column containing the chelating agent so as to selectively remove platinum from the stream. The solution may be circulated through the ion exchange resin until a desired amount of platinum is recovered, preferably at least substantially all of the platinum in the solution. The amount of platinum present in the solution may be measured spectroscopically from, e.g., the outflow of the final exit (lag) column. Flow and/or volume totalizers at the inlet and outlet of ion exchange columns may be used to determine the amount of platinum loaded by mass balance (see FIG. 2).

The ratio and concentration of the metal ions entering the ion exchange resin, which may be present in a column, is not particularly limited. Platinum and rhenium having various ratios, including but not limited to ratios of from 1:1 Pt:Re to 1:300 Pt:Re, and concentrations as low as, e.g., 500 ppb may be treated in this fashion, with time and process economics being a limiting factor.

In general, the ion-exchange resins are advantageously limited to neutral and acidic streams (having a pH about 7 or lower) sufficient to avoid degradation of the resin through hydrolysis of the thiourea or thiouronium moiety. The ORP of the process stream is preferably limited to prevent oxidation of the thiourea or thiouronium moiety, and is preferably not above about 800 mV in potential, more preferably not above about 750 mV in potential, and most preferably not above about 600 mV in potential.

It should be noted that in the present embodiment, acid-soluble base metals refers to metallic elements other than those comprised of, e.g., W, Ta, Hf, Zr, Nb, Ti, Ru, and to a lesser extent Mo, which is minimally soluble under the described conditions. The flow volume, duration of circulation, and feed acidity may be varied according to the ion exchange column, and the fixed and mobile phases that are selected, as known to persons skilled in the art. Process economics and the platinum level in the solution will direct the selection of specific variables.

Referring to FIG. 2, desorption or the incineration of the resin then occurs. The platinum-bearing chelating resin may be rinsed with hydrochloric or sulfuric acid (preferably about 4-6 M) to remove entrained base metals present in the resin void volume and weakly absorbed Re(VII). To recover the bound platinum, the resin may then be burned, with the possible loss of platinum and any bound rhenium units.

Preferably, the platinum is selectively eluted using conventional methods, for example, using a 1%-3% w/v HCl or $H_2SO_4$ solution containing from 1 g/L to the solubility limit of thiourea in such systems. More preferably, a 1% w/v HCl solution containing 50 g/L thiourea is used. The desorbate can then be treated with any suitable chemical reductant, electrowon onto cathodes, or hydrolyzed into platinum sulfide by prolonged hydrolysis of the thiourea in strongly alkaline solutions (e.g., at a pH of at least about 10 and at a temperature of from room temperature (e.g., about 20° C.) to boiling).

In other aspects of the disclosure, the eluent may be any eluent capable of complexing and removing the platinum from the resin in situ. If the platinum is not removed in situ, the resin may be removed from the columns and incinerated for platinum value, as discussed above. A preferred elution agent is 1-3% w/v HCl with 30-80 g/L thiourea. Other elution agents that may be used include water-soluble thiocyanate salts, alkali or alkaline earth metal cyanides, or strong alkali bases. However, it is possible that strong bases and cyanides may destroy the re-usability of the resin, and thus varying degrees of recovery may be achieved using such elution agents. It has been found that, generally, a 10-12 bed volume (BV) elution with thiourea solution will achieve elution of about 95-98% of the bound platinum. A preferred temperature of 60° C. may be used, but other temperatures may also be used, including temperatures from room temperature (e.g., about 20° C.) to about 80° C.

Referring to FIG. 2, the platinum is recovered and refined following its removal from the chelating resin. The platinum produced in this manner is preferably substantially pure and free of rhenium and base metals and may be refined to a commercially-acceptable purity specification using methods known in the art. Of particular import is that platinum so produced is more easily refined than traditional hydrolytic methods, which fail to remove rhenium as a contaminant.

Referring to the embodiment shown in FIG. 2, platinum is recovered and refined upstream, in part or in whole, prior to the rhenium recovery process, such that rhenium units are not lost and rhenium recovery processes, for example ion exchange and solvent extraction, are not contaminated or damaged by the presence of excessive platinum concentrations. According to this embodiment, at least about 80% of the platinum present in the liquid stream may be removed prior to the rhenium recovery. Preferably at least about 85%, more preferably at least about 90%, even more preferably at least about 95%, and most preferably substantially all of the platinum in the liquid stream is removed prior to the rhenium recovery process.

Referring to FIG. 2, after suitable platinum removal and decontamination has been achieved, the rhenium-containing process stream is processed to recover the rhenium. The rhenium-containing process stream will typically contain base metal salts and Re(VII). A typical example of a rhenium recovery cycle may include loading a weak or strong base resin (e.g., PUROLITE A170, A172) with rhenium, washing or otherwise eluting weakly bound species from the resin, rinsing off excess acidity, and then eluting the rhenium with an alkaline solution capable of regenerating the ion exchange resin and stripping/eluting the rhenium. The rhenium eluate thus obtained may then be processed further, via evaporation and crystallization to ammonium perrhenate or other sparingly soluble perrhenate salts, so as to make salts, compounds, or metallic rhenium powders of high purity for diverse applications.

In an aspect of the present disclosure, the step of rhenium recovery may include the rhenium-containing stream being separately passed through an ion exchange column for rhenium sorption and recovery. In such an aspect, an initial phase may include loading of the column with rhenium units. A second phase may include washing or removing undesirable contaminants, which may be bound weakly with low affinity, physisorbed, or else present in the void volume of the resin pores, from the column by using, for example, acids having sufficient acidity to prevent hydrolytic precipitation of base metals (e.g., 1-2 BV/h, for 1 hour), water (e.g., 1-3 BV/h, for 1 hour; or until the pH of outlet is from about 5 to about 7). A final phase may include elution via a 1-5 M ammonium hydroxide solution (e.g., 1-5 BV/h, for 1-2 hours or until Re(VII) is eluted). The resin may then be finally rinsed free from eluate using, e.g., distilled water, and may be reconditioned using, e.g., a dilute sulfuric acid wash (e.g., 3-5 BV/h, for 1 hour).

Suitable but not limiting examples of resins that may be used in the rhenium recovery process are PUROLITE A170 or A172; both are weak base functionalized resins useful in rhenium recovery applications. Another more selective product for rhenium recovery and refining is based upon Molecular Recognition Technology, an example being SUPERLIG 188 manufactured exclusively by IBC Technologies® of American Fork, Utah.

All commercially available rhenium sorption resins or solvent extractants result in significant platinum uptake, since platinum co-loads into the resins or extractants alongside rhenium, as it does with all commercially available weak and strong base-functionalized resins. Co-loading occurs because platinum and rhenium have similar chemistries, which makes them difficult to separate hydrometallurgically. The affinity of both Pt (II) and (IV) complexes in acidic conditions to weak base resins is comparable or greater than rhenium (VII), making separation with that technology untenable. A similar situation arises with solvent extraction reagents based on amines (e.g., ALAMINE, ALIQUAT brands, and the like), alkyl phosphates (e.g., tributyl phosphate (TBP)), and alkylated phosphines and their oxides (e.g., trioctylphosphine oxide (TOPO)); these extractants also recover rhenium in addition to and without distinction from platinum. For this reason, if platinum recovery is not substantially performed before rhenium sorption or solvation, the resin or solvent extractant agent is likely to become contaminated with platinum and require extensive, expensive, and often environmentally undesirable separation methodologies. According to the present disclosure, these disadvantages of current recovery processes can be avoided, and accurate mass balance and proper partitioning and separation of platinum from rhenium is possible in streams processed via conventional hydrometallurgy.

Referring to FIG. 2, the rhenium eluate thus obtained is then processed further (e.g., by evaporation and crystallization to ammonium perrhenate or other sparingly soluble perrhenate salts) to make salts, compounds, or metallic rhenium powders of high purity for diverse applications. As mentioned above, the insoluble residue left over from the digestion of the feedstock may contain Ta, Nb, Zr, Hf, Mo, and W—valuable elements that may be further recovered, separated, or otherwise purified.

The oxidative digestion of the described feedstocks can optionally be conducted using aqua regia (a mixture of nitric and hydrochloric acids) for superior digestion kinetics. In some exemplary embodiments, a mixture of nitric acid and hydrochloric acid may be used. The hydrochloric acid to nitric acid (v/v) in such exemplary embodiments may be provided, on a concentrated acid basis, from about 1:3 to about 10:1. Furthermore, the hydrochloric acid, in some exemplary embodiments, may constitute a major portion of the acid mixture.

It is noted that the specific processing conditions of FIG. 2 are illustrative only, and do not limit the scope of the disclosure of FIG. 2.

Example 1

A 100.0 g sample of superalloy granulate of undetermined mesh size produced from the induction melting of platinum-aluminide-coated CMSX-4 superalloy high pressure turbine blades was digested per the first embodiment. The initial composition of the alloy is described in Table 1. The feedstock alloy was charged into a 2 liter round bottom Pyrex flask equipped with an ORP meter/temperature probe and dosing pump for the addition of 35% w/v $H_2O_2$. 1.25 liters of 800 g/L sulfuric acid (with precautions taken to ensure the reagents were free of halides) was added into the reactor and hydrogen peroxide pumped in incrementally to maintain an ORP at or above 500 mV relative to Ag/AgCl. No stirring was employed. After the initial exotherm subsided, the mixture was heated at 80-90° C. for 35 hours. To check the completion of the reaction, the dosing pump was switched off and the reaction mixture examined visually to ensure no hydrogen gas was produced, which would be indicative of incomplete digestion of the base metals. The pH of the solution remained below 1 for the duration of the digestion and additional peroxide was added before filtration until an ORP of +800 mV was maintained. The dark green reaction mixture was then vacuum filtered through a pre-tared Whatman 42 filter paper to separate the insoluble residue. The residue was rinsed with 5% w/v aqueous sulfuric acid until the filtrate was colorless and then with deionized water until the filtrate was pH 6. The final volume of the filtrate and all washings was 2.29 L. The dark grey filter cake was then dried to constant mass (12.757 g), the filter paper removed, and a 1 gram sample removed for microwave—assisted pressure digestion in 25 mL of 3 parts 70% w/v HF to 2 parts 70% w/v $HNO_3$ to 1 part 37% w/v HCl with 6 parts of deionized water. The filtrate from the superalloy digestion was dispensed into a pre-tared beaker and a 10 mL sample taken for density determination and analysis via ICP-MS. The results are summarized in Table 1.

The filtrate was found to contain substantially all of the soluble base metals and rhenium but negligible platinum. The filtrate, having a pH of <1 was then passed through 50 grams of Purolite A170 macroporous weak base resin loaded into a 30 cm×3 cm glass column with fitted disk to recover the rhenium. The resin had been preconditioned to the feed by equilibration for 5 h with 5 M $H_2SO_4$ solution. After the rhenium was sorbed onto the resin, the resin was washed with a 5% w/v aqueous solution of sulfuric acid to rinse the base metals from the void volume and then rinsed with deionized water to remove excess acidity. The resin was then eluted with 10 bed volumes (approx. 1 L) of 3 M ammonium hydroxide and the rhenium-containing eluate concentrated and then crystallized to yield ammonium perrhenate. No platinum was found to be in the rhenium fraction so obtained.

of hydrogen peroxide failed to increase the Re(VII) concentration in the lixiviant (i.e., leach solution) as measured by ICP-OES. The solution was filtered free of solids, the filter cake was washed well with dilute sulfuric acid (5% w/v) to remove base metals and soluble rhenium, and the rhenium recovered with PUROLITE A170 resin. Elution of the resin with aqueous ammonia produced an ammonium perrhenate stream substantially devoid of platinum (<1 mg/L), based on the detection limit of the measurement apparatus. The concentration of platinum remaining in the insoluble filter cake material was found to be nearly ten times higher than in the feed material, corresponding well with the expected mass loss due to sulfuric-acid soluble elements. The filter cake was leached with sodium chlorate and 6 M hydrochloric acid, filtered, and the filter cake rinsed with dilute hydrochloric acid (3% w/v) until washings were negative to stannous chloride colorimetric test for platinum (an orange indication on a test strip saturated with $SnCl_2$ solution). The filtrate was weighed, its density determined, sampled, and analyzed via ICP-OES. Essentially all of the platinum (>99.5%) was removed from the insoluble filter cake. In this example, 682 kg of feed material containing 2114 g (3.1 g/kg) Pt was processed. The second step removed 2105 g of platinum.

Comparative Example 1

Granulated superalloy material was digested in a mixture of sulfuric acid, water and hydrochloric acid with hydrogen peroxide addition with the oxidation-reduction potential maintained such that hydrogen gas was not formed during the dissolution. The feedstock contained 27 g/kg rhenium and 3.1 g/kg platinum after analysis of a sample and subsequent ICP-MS determination. All of the rhenium and platinum reported to the aqueous reaction mixture as

TABLE 1

Composition of Cannon Muskegon Single Crystal 4 Superalloy Feed (CMSX-4) and streams derived therefrom

| Ni | Co | Cr | Mo | W | Hf | Ta | Al | Ti | Re | Pt |
|---|---|---|---|---|---|---|---|---|---|---|
| Elemental composition (wt. %) | | | | | | | | | | |
| 62.00 | 8.75 | 6.41 | 0.61 | 6.00 | 0.11 | 6.50 | 5.60 | 1.00 | 2.71 | 0.31 |
| After treatment per Embodiment 1-insoluble residues (wt. %) | | | | | | | | | | |
| — | — | 3.20 | 1.19 | 41.30 | 0.89 | 50.94 | — | — | 0.04 | 2.43 |
| % Recovery (wt percent) | | | | | | | | | | |
| <0.2 | — | — | — | — | — | — | — | 0.2 | 99.98 | |
| After treatment per Embodiment 1-aqueous Re stream (ppm) | | | | | | | | | | |
| 27100 | N.M. | N.M. | N.M. | N.M. | N.M. | N.M. | N.M. | N.M. | 1170 | 0.2 |
| Ammoniacal Re eluate (ppm) (before crystallization) | | | | | | | | | | |
| <5 | <5 | <5 | 52 | 45 | N.M. | N.M. | N.M. | N.M. | 2657 | NIL |

N.M. = not measured. Some recoveries are higher than unity due to formation of oxides.
NIL = No detectable amount, based on instrument used.

Example 2

Granulated superalloy material of the composition and form described in Example 1 was digested in a mixture of aqueous sulfuric acid (initially 800 g/L) and hydrogen peroxide with the oxidation-reduction potential maintained at all times above 500 mV relative to Ag/AgCl. The reagents used were checked for halide contamination with silver nitrate solution to ensure no complexing halides were present. The digestion was terminated after subsequent additions Re(VII) and Pt(IV), the content of the metals as reported in Table 1. The mixture was as separated from insoluble solids (W, Ta, Zr, Hf, Ti oxides) by flocculation and filter pressing using 150 ppm nonionic polyacrylamide polymer and standard pressing conditions with two washes of the filter cake with distilled water. The solids-free solution was circulated at ambient pressure and temperature through PUROLITE A170 weak base resin to recover the rhenium until the rhenium outflow from the lag column was less than 1 ppm. Elution of the rhenium bound to the resin via 4 M aqueous ammonia produced a strip solution containing both platinum and rhenium, thus no separation was achieved. Ammonium perrhenate produced from such a solution by evaporation and recrystallization was thereby contaminated with platinum.

Although the present disclosure has been made in detail with reference to specific embodiments, materials and examples, it is not limited thereby, and persons skilled in the art will be able to make variations in the disclosed examples and description without departing from the spirit and scope of the disclosure as described in the claims.

It should be understood that the embodiments above are not limited to the specific aspects disclosed above. In particular, aspects of each of the embodiments are available for use in other embodiments, and the specific embodiments described herein should not be construed as being limited to only the conditions disclosed with respect to that specific embodiment unless otherwise noted.

We claim:

1. A method of separating platinum and rhenium comprising the steps of:
   contacting a liquid comprising platinum and rhenium and a chelating ion exchange resin; and
   adsorbing the platinum onto the chelating ion exchange resin,
   further comprising, prior to the step of contacting the liquid comprising platinum and rhenium and a chelating ion exchange resin, the steps of:
   digesting an alloy feed comprising platinum and rhenium in a complexing ligand comprising halides in an amount sufficient to complex the platinum present in the alloy feed; and
   separating resulting solids from the liquid comprising platinum and rhenium,
   wherein a concentration of rhenium and/or platinum in the resulting solids is from 50 to 100% lower than a concentration of rhenium and/or platinum in the alloy feed,
   the method further comprising, following the step of contacting the liquid comprising platinum and rhenium and a chelating ion exchange resin, obtaining a liquid stream comprising a higher relative concentration of rhenium to platinum than a relative concentration of rhenium to platinum in the liquid comprising platinum and rhenium.

2. The method of claim 1, wherein the chelating ion exchange resin is functionalized with thiourea or thiouronium groups.

3. The method of claim 1, wherein the pH of the liquid comprising platinum and rhenium is below 5.

4. The method of claim 1, wherein the complexing ligand is selected from the group consisting of hydrochloric acid, a chloride containing salt, bromine and bromide salts, or chlorine.

5. The method of claim 1, wherein the step of digesting further comprises digesting the alloy feed comprising platinum and rhenium in an oxidant capable of oxidizing both platinum and rhenium from their metallic zero-valence state to platinum's fourth oxidation state and rhenium's heptavalent oxidation state.

6. The method of claim 5, wherein the oxidant is selected from the group consisting of peroxides, nitric acid and its salts, chlorates, chlorine, HCl, sulfuric acid, sodium chlorite, acids, oxygen, air, and mixtures thereof.

7. The method of claim 6, wherein the oxidant is chlorate or a mixture of HCl and sulfuric acid.

8. The method of claim 6, wherein the oxidant is sodium chlorite and an acid.

9. The method of claim 1, wherein a concentration of rhenium and/or platinum in the resulting solids is from 90 to 100% lower than a concentration of rhenium and/or platinum in the alloy feed.

10. The method of claim 1, wherein a concentration of rhenium and/or platinum in the resulting solids is from 99 to 100% lower than a concentration of rhenium and/or platinum in the alloy feed.

11. The method of claim 1, further comprising, prior to the step of contacting a liquid comprising platinum and rhenium and a chelating ion exchange resin, a step of decreasing an oxidative reduction potential value of the liquid comprising platinum and rhenium.

12. The method of claim 11, wherein the step of decreasing an oxidative reduction potential value of the liquid comprising platinum and rhenium comprises adding reducing agents to the liquid comprising platinum and rhenium.

13. The method of claim 12, wherein the reducing agents are capable of reducing platinum (IV) to platinum (II) without affecting the oxidation state of rhenium in solution (Re(VII)).

14. The method of claim 13, wherein the reducing agents comprise sulfites, sulfur dioxide gas, or $N_2H_4$ salts.

15. The method of claim 13, wherein the reducing agents comprise anhydrous sulfur dioxide, or a salt thereof, ascorbic acid, ethanol, or hydroxylamine hydrochloride.

16. The method of claim 11, wherein the step of decreasing an oxidative reduction potential value of the liquid comprising platinum and rhenium comprises treating the liquid comprising platinum and rhenium with sulfur dioxide gas.

17. The method of claim 1, wherein at least 60% of the platinum present in the liquid comprising platinum and rhenium is adsorbed onto the chelating ion exchange resin.

18. The method of claim 17, wherein at least 90% of the platinum present in the liquid comprising platinum and rhenium is adsorbed onto the chelating ion exchange resin.

19. The method of claim 18, wherein at least 99% of the platinum present in the liquid comprising platinum and rhenium is adsorbed onto the chelating ion exchange resin.

20. The method of claim 1, wherein less than 10% by weight of rhenium is adsorbed onto the chelating ion exchange resin, relative to the amount of platinum adsorbed onto the chelating ion exchange resin.

21. The method of claim 20, wherein less than 1% by weight of rhenium is adsorbed onto the chelating ion exchange resin, relative to the amount of platinum adsorbed onto the chelating ion exchange resin.

22. The method of claim 21, wherein less than 0.1% by weight of rhenium is adsorbed onto the chelating ion exchange resin, relative to the amount of platinum adsorbed onto the chelating ion exchange resin.

23. The method of claim 1, further comprising a step of recovering the platinum adsorbed onto the chelating ion exchange resin.

24. A method of separating platinum and rhenium comprising the steps of:
   contacting a liquid comprising platinum and rhenium and a chelating ion exchange resin; and
   adsorbing the platinum onto the chelating ion exchange resin,
   further comprising, prior to the step of contacting a liquid comprising platinum and rhenium and a chelating ion exchange resin, a step of decreasing an oxidative reduction potential value of the liquid comprising platinum and rhenium, the method further comprising, following the step of contacting the liquid comprising platinum and rhenium and a chelating ion exchange resin, obtaining a liquid stream comprising a higher relative concentration of rhenium to platinum than a relative concentration of rhenium to platinum in the liquid comprising platinum and rhenium.

25. The method of claim 24, further comprising, prior to the step of contacting the liquid comprising platinum and rhenium and a chelating ion exchange resin, the steps of:

digesting an alloy feed comprising platinum and rhenium in a complexing ligand comprising halides in an amount sufficient to complex the platinum present in the alloy feed; and separating resulting solids from the liquid comprising platinum and rhenium.

26. The method of claim 25, wherein the complexing ligand is selected from the group consisting of hydrochloric acid, a chloride containing salt, bromine and bromide salts, or chlorine.

27. The method of claim 25, wherein the step of digesting further comprises digesting the alloy feed comprising platinum and rhenium in an oxidant capable of oxidizing both platinum and rhenium from their metallic zero-valence state to platinum's fourth oxidation state and rhenium's heptavalent oxidation state.

28. The method of claim 27, wherein the oxidant is selected from the group consisting of peroxides, nitric acid and its salts, chlorates, chlorine, HCl, sulfuric acid, sodium chlorite, acids, oxygen, air, and mixtures thereof.

29. The method of claim 28, wherein the oxidant is chlorate or a mixture of HCl and sulfuric acid.

30. The method of claim 28, wherein the oxidant is sodium chlorite and an acid.

31. The method of claim 25, wherein a concentration of rhenium and/or platinum in the resulting solids is from 50 to 100% lower than a concentration of rhenium and/or platinum in the alloy feed.

32. The method of claim 31, wherein a concentration of rhenium and/or platinum in the resulting solids is from 90 to 100% lower than a concentration of rhenium and/or platinum in the alloy feed.

33. The method of claim 32, wherein a concentration of rhenium and/or platinum in the resulting solids is from 99 to 100% lower than a concentration of rhenium and/or platinum in the alloy feed.

34. The method of claim 24, wherein the chelating ion exchange resin is functionalized with thiourea or thiouronium groups.

35. The method of claim 24, wherein the pH of the liquid comprising platinum and rhenium is below 5.

36. The method of claim 24, wherein the step of decreasing an oxidative reduction potential value of the liquid comprising platinum and rhenium comprises adding reducing agents to the liquid comprising platinum and rhenium.

37. The method of claim 36, wherein the reducing agents are capable of reducing platinum (IV) to platinum (II) without affecting the oxidation state of rhenium in solution (Re(VII)).

38. The method of claim 37, wherein the reducing agents comprise sulfites, sulfur dioxide gas, or $N_2H_4$ salts.

39. The method of claim 37, wherein the reducing agents comprise anhydrous sulfur dioxide, or a salt thereof, ascorbic acid, ethanol, or hydroxylamine hydrochloride.

40. The method of claim 24, wherein the step of decreasing an oxidative reduction potential value of the liquid comprising platinum and rhenium comprises treating the liquid comprising platinum and rhenium with sulfur dioxide gas.

41. The method of claim 24, wherein at least 60% of the platinum present in the liquid comprising platinum and rhenium is adsorbed onto the chelating ion exchange resin.

42. The method of claim 41, wherein at least 90% of the platinum present in the liquid comprising platinum and rhenium is adsorbed onto the chelating ion exchange resin.

43. The method of claim 42, wherein at least 99% of the platinum present in the liquid comprising platinum and rhenium is adsorbed onto the chelating ion exchange resin.

44. The method of claim 24, wherein less than 10% by weight of rhenium is adsorbed onto the chelating ion exchange resin, relative to the amount of platinum adsorbed onto the chelating ion exchange resin.

45. The method of claim 44, wherein less than 1% by weight of rhenium is adsorbed onto the chelating ion exchange resin, relative to the amount of platinum adsorbed onto the chelating ion exchange resin.

46. The method of claim 45, wherein less than 0.1% by weight of rhenium is adsorbed onto the chelating ion exchange resin, relative to the amount of platinum adsorbed onto the chelating ion exchange resin.

47. The method of claim 24, further comprising a step of recovering the platinum adsorbed onto the chelating ion exchange resin.

48. A method of separating platinum and rhenium comprising the steps of:

contacting a liquid comprising platinum and rhenium and a chelating ion exchange resin; and adsorbing the platinum onto the chelating ion exchange resin, wherein less than 10% by weight of rhenium is adsorbed onto the chelating ion exchange resin, relative to the amount of platinum adsorbed onto the chelating ion exchange resin.

49. The method of claim 48, further comprising, prior to the step of contacting the liquid comprising platinum and rhenium and a chelating ion exchange resin, the steps of:

digesting an alloy feed comprising platinum and rhenium in a complexing ligand comprising halides in an amount sufficient to complex the platinum present in the alloy feed; and separating resulting solids from the liquid comprising platinum and rhenium.

50. The method of claim 49, wherein the complexing ligand is selected from the group consisting of hydrochloric acid, a chloride containing salt, bromine and bromide salts, or chlorine.

51. The method of claim 49, wherein the step of digesting further comprises digesting the alloy feed comprising platinum and rhenium in an oxidant capable of oxidizing both platinum and rhenium from their metallic zero-valence state to platinum's fourth oxidation state and rhenium's heptavalent oxidation state.

52. The method of claim 51, wherein the oxidant is selected from the group consisting of peroxides, nitric acid and its salts, chlorates, chlorine, HCl, sulfuric acid, sodium chlorite, acids, oxygen, air, and mixtures thereof.

53. The method of claim 52, wherein the oxidant is chlorate or a mixture of HCl and sulfuric acid.

54. The method of claim 52, wherein the oxidant is sodium chlorite and an acid.

55. The method of claim 49, wherein a concentration of rhenium and/or platinum in the resulting solids is from 50 to 100% lower than a concentration of rhenium and/or platinum in the alloy feed.

56. The method of claim 55, wherein a concentration of rhenium and/or platinum in the resulting solids is from 90 to 100% lower than a concentration of rhenium and/or platinum in the alloy feed.

57. The method of claim 56, wherein a concentration of rhenium and/or platinum in the resulting solids is from 99 to 100% lower than a concentration of rhenium and/or platinum in the alloy feed.

58. The method of claim 48, wherein the chelating ion exchange resin is functionalized with thiourea or thiouronium groups.

59. The method of claim 48, wherein the pH of the liquid comprising platinum and rhenium is below 5.

60. The method of claim 48, further comprising, prior to the step of contacting a liquid comprising platinum and rhenium and a chelating ion exchange resin, a step of decreasing an oxidative reduction potential value of the liquid comprising platinum and rhenium.

61. The method of claim 60, wherein the step of decreasing an oxidative reduction potential value of the liquid comprising platinum and rhenium comprises adding reducing agents to the liquid comprising platinum and rhenium.

62. The method of claim 61, wherein the reducing agents are capable of reducing platinum (IV) to platinum (II) without affecting the oxidation state of rhenium in solution (Re(VII)).

63. The method of claim 62, wherein the reducing agents comprise sulfites, sulfur dioxide gas, or $N_2H_4$ salts.

64. The method of claim 62, wherein the reducing agents comprise anhydrous sulfur dioxide, or a salt thereof, ascorbic acid, ethanol, or hydroxylamine hydrochloride.

65. The method of claim 60, wherein the step of decreasing an oxidative reduction potential value of the liquid comprising platinum and rhenium comprises treating the liquid comprising platinum and rhenium with sulfur dioxide gas.

66. The method of claim 48, further comprising, following the step of contacting the liquid comprising platinum and rhenium and a chelating ion exchange resin, obtaining a liquid stream comprising a higher relative concentration of rhenium to platinum than a relative concentration of rhenium to platinum in the liquid comprising platinum and rhenium.

67. The method of claim 48, wherein at least 60% of the platinum present in the liquid comprising platinum and rhenium is adsorbed onto the chelating ion exchange resin.

68. The method of claim 67, wherein at least 90% of the platinum present in the liquid comprising platinum and rhenium is adsorbed onto the chelating ion exchange resin.

69. The method of claim 68, wherein at least 99% of the platinum present in the liquid comprising platinum and rhenium is adsorbed onto the chelating ion exchange resin.

70. The method of claim 48, wherein less than 1% by weight of rhenium is adsorbed onto the chelating ion exchange resin, relative to the amount of platinum adsorbed onto the chelating ion exchange resin.

71. The method of claim 70, wherein less than 0.1% by weight of rhenium is adsorbed onto the chelating ion exchange resin, relative to the amount of platinum adsorbed onto the chelating ion exchange resin.

72. The method of claim 48, further comprising a step of recovering the platinum adsorbed onto the chelating ion exchange resin.

73. A method of separating platinum and rhenium comprising the steps of:
    contacting a liquid comprising platinum and rhenium and a chelating ion exchange resin; and
    adsorbing the platinum onto the chelating ion exchange resin,
    wherein less than 0.1% by weight of rhenium is adsorbed onto the chelating ion exchange resin, relative to the amount of platinum adsorbed onto the chelating ion exchange resin.

74. The method of claim 73, further comprising, prior to the step of contacting the liquid comprising platinum and rhenium and a chelating ion exchange resin, the steps of:
    digesting an alloy feed comprising platinum and rhenium in a complexing ligand comprising halides in an amount sufficient to complex the platinum present in the alloy feed; and
    separating resulting solids from the liquid comprising platinum and rhenium.

75. The method of claim 74, wherein the complexing ligand is selected from the group consisting of hydrochloric acid, a chloride containing salt, bromine and bromide salts, or chlorine.

76. The method of claim 74, wherein the step of digesting further comprises digesting the alloy feed comprising platinum and rhenium in an oxidant capable of oxidizing both platinum and rhenium from their metallic zero-valence state to platinum's fourth oxidation state and rhenium's heptavalent oxidation state.

77. The method of claim 76, wherein the oxidant is selected from the group consisting of peroxides, nitric acid and its salts, chlorates, chlorine, HCl, sulfuric acid, sodium chlorite, acids, oxygen, air, and mixtures thereof.

78. The method of claim 77, wherein the oxidant is chlorate or a mixture of HCl and sulfuric acid.

79. The method of claim 77, wherein the oxidant is sodium chlorite and an acid.

80. The method of claim 74, wherein a concentration of rhenium and/or platinum in the resulting solids is from 50 to 100% lower than a concentration of rhenium and/or platinum in the alloy feed.

81. The method of claim 80, wherein a concentration of rhenium and/or platinum in the resulting solids is from 90 to 100% lower than a concentration of rhenium and/or platinum in the alloy feed.

82. The method of claim 81, wherein a concentration of rhenium and/or platinum in the resulting solids is from 99 to 100% lower than a concentration of rhenium and/or platinum in the alloy feed.

83. The method of claim 73, wherein the chelating ion exchange resin is functionalized with thiourea or thiouronium groups.

84. The method of claim 73, wherein the pH of the liquid comprising platinum and rhenium is below 5.

85. The method of claim 73, further comprising, prior to the step of contacting a liquid comprising platinum and rhenium and a chelating ion exchange resin, a step of decreasing an oxidative reduction potential value of the liquid comprising platinum and rhenium.

86. The method of claim 85, wherein the step of decreasing an oxidative reduction potential value of the liquid comprising platinum and rhenium comprises adding reducing agents to the liquid comprising platinum and rhenium.

87. The method of claim 86, wherein the reducing agents are capable of reducing platinum (IV) to platinum (II) without affecting the oxidation state of rhenium in solution (Re(VII)).

88. The method of claim 87, wherein the reducing agents comprise sulfites, sulfur dioxide gas, or $N_2H_4$ salts.

89. The method of claim 87, wherein the reducing agents comprise anhydrous sulfur dioxide, or a salt thereof, ascorbic acid, ethanol, or hydroxylamine hydrochloride.

90. The method of claim 85, wherein the step of decreasing an oxidative reduction potential value of the liquid comprising platinum and rhenium comprises treating the liquid comprising platinum and rhenium with sulfur dioxide gas.

91. The method of claim 73, further comprising, following the step of contacting the liquid comprising platinum and rhenium and a chelating ion exchange resin, obtaining a liquid stream comprising a higher relative concentration of rhenium to platinum than a relative concentration of rhenium to platinum in the liquid comprising platinum and rhenium.

92. The method of claim 73, wherein at least 60% of the platinum present in the liquid comprising platinum and rhenium is adsorbed onto the chelating ion exchange resin.

93. The method of claim 92, wherein at least 90% of the platinum present in the liquid comprising platinum and rhenium is adsorbed onto the chelating ion exchange resin.

94. The method of claim 93, wherein at least 99% of the platinum present in the liquid comprising platinum and rhenium is adsorbed onto the chelating ion exchange resin.

95. The method of claim 73, further comprising a step of recovering the platinum adsorbed onto the chelating ion exchange resin.

96. A method of separating platinum and rhenium comprising the steps of:
   contacting a liquid comprising platinum and rhenium and a chelating ion exchange resin; and
   adsorbing the platinum onto the chelating ion exchange resin,
   further comprising, prior to the step of contacting a liquid comprising platinum and rhenium and a chelating ion exchange resin, a step of decreasing an oxidative reduction potential value of the liquid comprising platinum and rhenium,
   wherein the step of decreasing an oxidative reduction potential value of the liquid comprising platinum and rhenium comprises treating the liquid comprising platinum and rhenium with sulfur dioxide gas,
   the method further comprising, following the step of contacting the liquid comprising platinum and rhenium and a chelating ion exchange resin, obtaining a liquid stream comprising a higher relative concentration of rhenium to platinum than a relative concentration of rhenium to platinum in the liquid comprising platinum and rhenium.

97. The method of claim 96, further comprising, prior to the step of contacting the liquid comprising platinum and rhenium and a chelating ion exchange resin, the steps of:
   digesting an alloy feed comprising platinum and rhenium in a complexing ligand comprising halides in an amount sufficient to complex the platinum present in the alloy feed; and
   separating resulting solids from the liquid comprising platinum and rhenium.

98. The method of claim 97, wherein the complexing ligand is selected from the group consisting of hydrochloric acid, a chloride containing salt, bromine and bromide salts, or chlorine.

99. The method of claim 97, wherein the step of digesting further comprises digesting the alloy feed comprising platinum and rhenium in an oxidant capable of oxidizing both platinum and rhenium from their metallic zero-valence state to platinum's fourth oxidation state and rhenium's heptavalent oxidation state.

100. The method of claim 99, wherein the oxidant is selected from the group consisting of peroxides, nitric acid and its salts, chlorates, chlorine, HCl, sulfuric acid, sodium chlorite, acids, oxygen, air, and mixtures thereof.

101. The method of claim 100, wherein the oxidant is chlorate or a mixture of HCl and sulfuric acid.

102. The method of claim 100, wherein the oxidant is sodium chlorite and an acid.

103. The method of claim 97, wherein a concentration of rhenium and/or platinum in the resulting solids is from 50 to 100% lower than a concentration of rhenium and/or platinum in the alloy feed.

104. The method of claim 103, wherein a concentration of rhenium and/or platinum in the resulting solids is from 90 to 100% lower than a concentration of rhenium and/or platinum in the alloy feed.

105. The method of claim 104, wherein a concentration of rhenium and/or platinum in the resulting solids is from 99 to 100% lower than a concentration of rhenium and/or platinum in the alloy feed.

106. The method of claim 96, wherein the chelating ion exchange resin is functionalized with thiourea or thiouronium groups.

107. The method of claim 96, wherein the pH of the liquid comprising platinum and rhenium is below 5.

108. The method of claim 96, wherein at least 60% of the platinum present in the liquid comprising platinum and rhenium is adsorbed onto the chelating ion exchange resin.

109. The method of claim 108, wherein at least 90% of the platinum present in the liquid comprising platinum and rhenium is adsorbed onto the chelating ion exchange resin.

110. The method of claim 109, wherein at least 99% of the platinum present in the liquid comprising platinum and rhenium is adsorbed onto the chelating ion exchange resin.

111. The method of claim 96, wherein less than 10% by weight of rhenium is adsorbed onto the chelating ion exchange resin, relative to the amount of platinum adsorbed onto the chelating ion exchange resin.

112. The method of claim 111, wherein less than 1% by weight of rhenium is adsorbed onto the chelating ion exchange resin, relative to the amount of platinum adsorbed onto the chelating ion exchange resin.

113. The method of claim 112, wherein less than 0.1% by weight of rhenium is adsorbed onto the chelating ion exchange resin, relative to the amount of platinum adsorbed onto the chelating ion exchange resin.

114. The method of claim 96, further comprising a step of recovering the platinum adsorbed onto the chelating ion exchange resin.

* * * * *